June 19, 1951          E. F. BURTON          2,557,813

METHOD AND APPARATUS FOR PREPARING FROZEN CONFECTIONS

Filed Dec. 7, 1948          2 Sheets—Sheet 1

INVENTOR.
EDWARD F. BURTON
BY
Edwin Coates
ATTORNEY.

June 19, 1951 E. F. BURTON 2,557,813
METHOD AND APPARATUS FOR PREPARING FROZEN CONFECTIONS
Filed Dec. 7, 1948 2 Sheets—Sheet 2
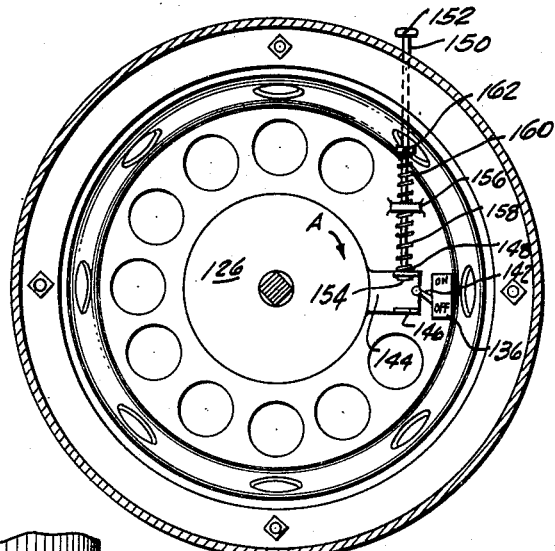
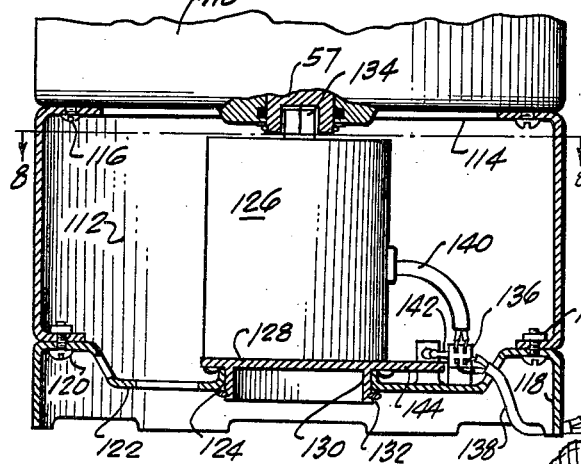
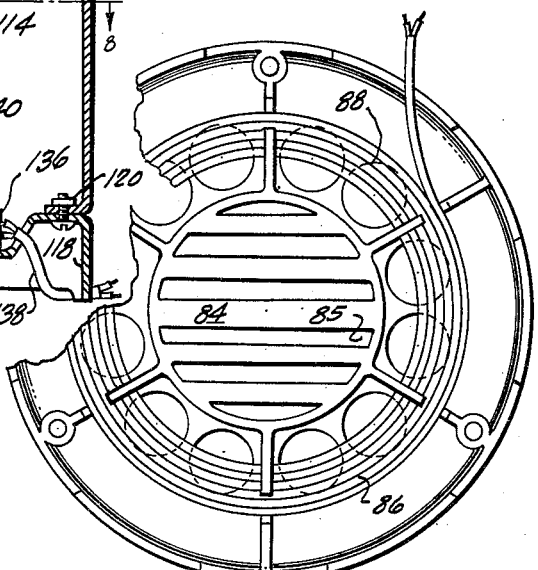
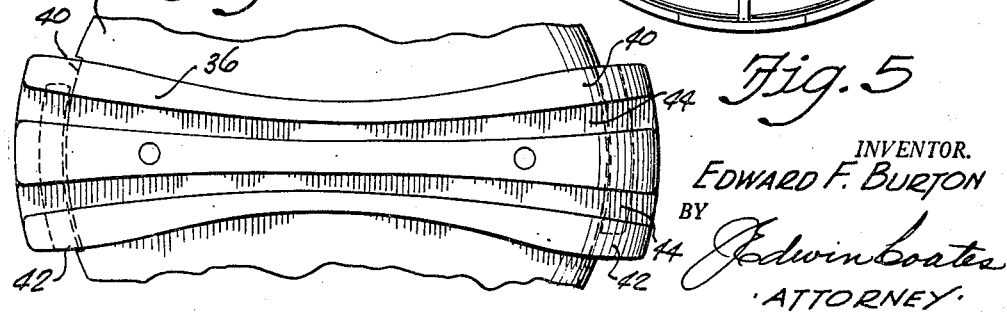
INVENTOR.
EDWARD F. BURTON
BY Edwin Coates
ATTORNEY Patented June 19, 1951

2,557,813

UNITED STATES PATENT OFFICE 2,557,813

METHOD AND APPARATUS FOR PREPARING FROZEN CONFECTIONS

Edward F. Burton, Los Angeles, Calif.

Application December 7, 1948, Serial No. 64,024

15 Claims. (Cl. 62—114)

This invention relates to a means and method for preparing frozen confections and is more particularly directed to an ice cream freezer which automatically freezes ice cream and maintains it at the proper consistency for a long period of time and to a method of operating it to obtain the desired result.

There are available at the present time both manual and power operated ice cream freezers but each has disadvantages which detract from its utility. The manual type is inconvenient and difficult to operate, and the heat losses thru the metal driving mechanism and other parts require that an insulating blanket of some kind be placed over the freezer to keep the ice cream in proper condition for any length of time. Moreover, the speed of churning varies with different operators and even with the same operator as he becomes fatigued. To obtain the best results it is necessary to maintain a substantially constant predetermined speed.

The electrical type, as presently available, is equally subject to undesirable heat losses and no thought has been given to the determination or maintenance of a proper churning speed. Moreover, it is necessary to open the freezer and inspect the mix from time to time in order to turn the motor off when the proper consistency is reached. This is a nuisance and a further cause of heat loss which results in a need for a larger container to hold more ice.

The method and means of the present invention overcome all of the disadvantages above mentioned and, for the first time, make possible a fully automatic, self-packing freezer of minimum bulk for the amount of frozen confection to be prepared.

The freezer hereinafter described in detail in one of its forms comprises a unitary container formed of a material having a high heat insulating value, divided by a horizontal partition wall into an upper freezing chamber and a lower power chamber. By virtue of this arrangement the motor is substantially totally enclosed and out of the way and the churn is readily accessible from the top.

A lid of the same material is provided with means to form a substantially air tight seal, thus reducing heat exchange by radiation, conduction, and convection to a minimum. The partition effectively prevents transmission of heat from the motor compartment to the freezing compartment, and a coupling or stub shaft of the same or a similar heat insulating material extends thru a bearing in the partition to prevent direct conduction of heat from the motor to the churn.

Another feature of novelty is the formation of the interior wall of the container. It is desirable, if possible, to use ice cubes made in conventional domestic refrigerators to avoid the expense and trouble of purchasing a cake of ice and crushing it to use as a refrigerant. The unusual insulating characteristics of the present invention make it possible to obtain enough refrigeration with 50 to 100 ice cubes to freeze and pack about two quarters of ice cream or the equivalent. In fact, experiments have shown that approximately one cubic inch of liquid can be frozen to a proper consistency with one cubic inch of ice.

Ice cubes tend to rotate with the metal churn and slide along the smooth inner wall of the container. This is undesirable since maximum heat transfer from the churn to the ice requires a scrubbing action between them. In the present invention this result is obtained by providing integral, vertical, radially inwardly extending ribs on the inner wall of the container, circumferentially spaced to provide pockets for the ice cubes between them and extending close enough to the churn to prevent individual cubes from passing thru the gap.

An electrical motor, carried in the lower compartment, is geared down to provide a shaft speed of fifty to seventy revolutions per minute under normal load, which has been determined in practice to be the most satisfactory churning and freezing speed. The device has been made fully automatic by the provision of a switch which automatically opens the circuit when the current, or the heating of the motor resulting from the current, reaches a predetermined value because of the increased torque requirements of the mix as it reaches the desired consistency. In a modified form the torque reaction itself throws the switch and opens the circuit at the proper time. It is contemplated that the switch may be of the manual reset type or of the automatic reset type. In the latter case the motor will be automatically energized from time to time and, if the consistency has been reduced, the churn will again be operated until the torque requirements again reach a predetermined value. In this manner the confection may be maintained in optimum condition for many hours.

The above and other advantages will become more readily apparent as the description proceeds. The presently preferred embodiments are illustrated in the accompanying drawings in which:

Figure 5 is a bottom plan view of the base member;

Figure 6 is a top plan view of the handle and lid, a part of the latter being broken away;

Figure 7 is a sectional view in elevation of a modified power compartment with a mechanically actuated switch; and Figure 8 is a sectional view taken on line 8—8 of Figure 7.

Figure 1:
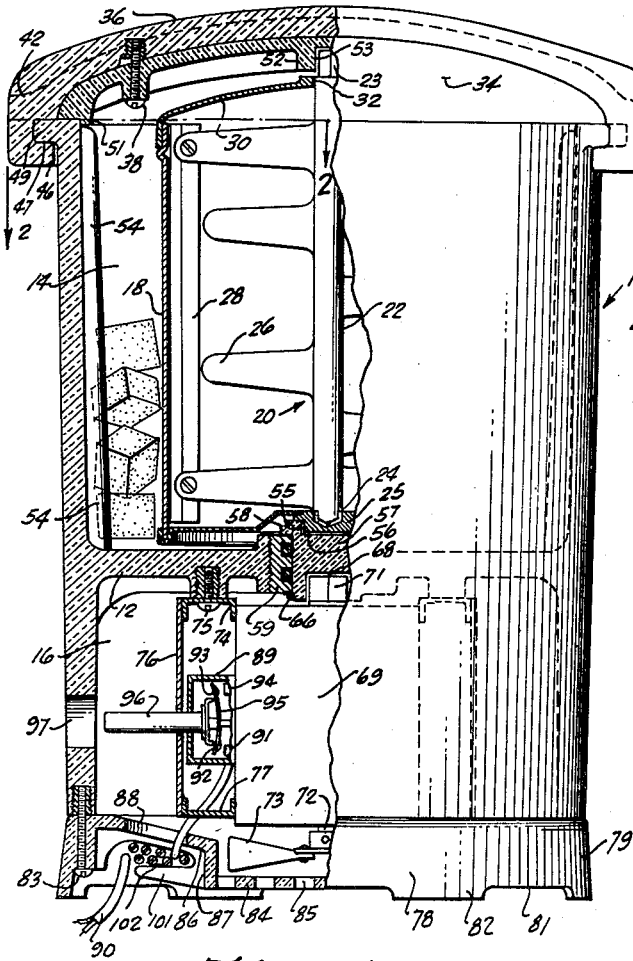
Figure 1 is an elevational view, partly in section, of the container and contents showing the arrangement and configuration of the principal elements.

The freezer, as seen in Figure 1, includes an upright cylindrical container 10 formed of a molded plastic material having good insulating properties, such as urea, phenol, or melamine formaldehyde, altho any other material having suitable insulating properties may be used. In most instances it is preferable to provide a reinforcing filler for the plastic, such as cotton linters or flock, or macerated cloth, or mineral fibers. Intermediate its ends the container is provided with a horizontal wall 12, preferably formed integral therewith, which divides it into an upper refrigerant compartment 14 and a lower motor compartment 16.

Located in the upper compartment is a churn of substantially conventional construction including a metallic container 18 and a dasher 20, the latter having a shaft 22 squared at its upper end 23 and provided with a plain, shouldered journal 24 at its lower end for free rotation in the plug 25 which forms the central portion of the bottom of the container 18. The dasher has arms 26 carrying wooden scrapers 28. A cover 30 fits over the top of the container and is provided with a central opening 32 to freely receive the shaft 22.

A lid 34 is arranged in substantially airtight sealing engagement with the upper edge of the container 10 and is provided with a handle 36 secured thereto by screws 38. The lid is recessed at 40, as will be seen in Figures 1 and 6, to receive the depending portion 42 of the handle in interlocking engagement. The handle is provided with longitudinal grooves 44 to reduce weight while maintaining adequate strength.

Figure 2:
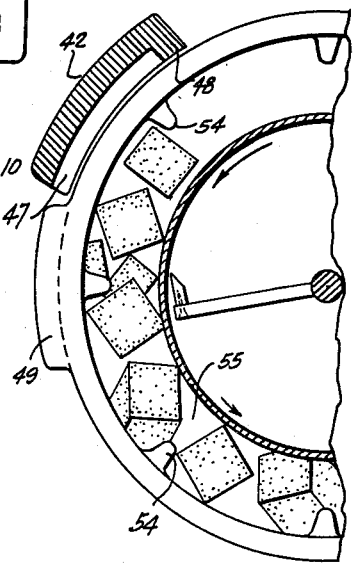
Figure 2 is a sectional view taken on line 2—2 of Figure 1 showing the rib form and the lid locking means.

The depending portions 42 are provided with inwardly extending lugs 46 forming channels 47, closed at one end 48, for engagement with flanges 49 extending outwardly from the upper edge of the container. The lid is also provided with a centering flange 51. When the lid is applied to the container in the relation indicated in Figure 2 and centered by the flange 51, it is then rotated counter clockwise as viewed in Figure 2 until the lugs 46 are fully engaged with flanges 49, locking the lid in sealing engagement. Both the lid and the handle are formed of heat insulating material to complete the isolation of the refrigerant compartment from the ambient air.

A boss 52, centrally located in the underside of the lid, is provided with a squared socket 53 to receive the squared end 23 of the dasher shaft to prevent its rotation during the churning action. The container 18 is driven in a counter clockwise direction, as viewed in Figure 2, by means later to be described.

One of the purposes of the invention is to make it feasible to use ordinary home produced ice cubes, together with salt or the like, as a refrigerant. In order to prevent the ice cubes from rotating with the container 18 a series of integral, vertically arranged, peripherally spaced ribs 54 is provided. These ribs are relatively narrow and provide between them pockets for the reception of a plurality of cubes. The gap between each rib and the wall of container 18 is made small enough to prevent passage of the cubes. The gap is preferably of the order of one inch altho it can be reduced to mere working clearance if so desired. It need not be extremely small because as the individual cubes melt down they also tend to bond together and make irregular masses of substantial size.

The plug 25 at the center of the churn has a squared boss 55 extending downwardly to seat non-rotatably in a squared socket 56 in the stub shaft or coupling 57. The latter is formed of heat insulating material to prevent transmission of heat from the motor to the churn. The coupling, near its upper end, is provided with an annular shoulder 58 seating on the upper edge of a bronze bearing 59 which is permanently secured in the partition wall, as by molding in place. The bearing is provided with upper and lower circumferential grooves 61 and 62, the upper groove carrying an elastic, sealing, O ring 63 and the lower carrying a felt or other lubricant providing ring 64. Near its lower end the coupling has an annular groove 65 to receive a snap ring 66 which bears against washer 67 and locks the coupling against axial removal. Another squared socket 68 is formed in the lower face of the coupling to receive the motor drive.

An electric motor 69 is located in the lower compartment 16 and is provided with enclosed gearing to reduce its rotor speed down to a drive shaft speed of 50 to 90 revolutions per minute depending on load. Its upper extension shaft 71 is squared to fit in socket 68 and drive the churn and its lower extension shaft 72, which preferably runs at full rotor speed, carries a cooling fan 73.

The motor is suspended from the partition wall 12 by means of a plurality of narrow brackets 74 of strip material attached to the wall by screws 75. The outer ends of the brackets support a cylindrical cowling ring 76 and similar spacink brackets 77 extend between the lower ends of the motor and the cowling ring.

A base member 78 is provided to enclose and protect the motor elements and also to avoid the danger of injury from the fan 73 when it is in motion. The base member includes a skirt 79 having a plurality of cut away portions 81 defining between them a series of supporting feet 82. Screws 83 secure the base member to the bottom of the container 12. The central portion of the base member comprises a horizontal plate 84 with a series of ventilating slots 85 therein as best illustrated in Figure 6. Plate 84 is connected to the skirt by a dished annular wall 86 and a shallow cylindrical wall 87, and wall 86 is pierced by a series of ventilating apertures 88. It will be noted in Figure 1 that the lower end of cowling 76 contacts the wall 86 between the series of apertures 85 and the series of apertures 88 and that its upper end is spaced from wall 12. Consequently air brought in thru apertures 85 by the fan 73 is forced along the casing wall of motor 69 and exhausted thru aperture 88 to provide normal cooling for the motor.

The power and other characteristics of the motor are so chosen that the speed of shaft 71 is approximately 90 R. P. M. at no load and approximately 70 R. P. M. when the mix is in the churn in liquid form. As the consistency of the mix increases the torque requirement increases, and the shaft speed slows down to about 50 R. P. M. at the desired end point and the motor draws a correspondingly greater current.

Under these latter conditions the cooling system is inadequate to prevent a substantial temperature rise in the motor. Advantage is taken of this arrangement to turn off the motor automatically when the mix has reached the desired consistency. An automatic circuit breaker is provided at 89 to open the circuit upon attainment of a predetermined elevated temperature. The breaker shown in Figure 1 is typical of the manual reset type made under the trade name "Klixon" and illustrated and described in Bulletin No. PR134 issued by Spencer Thermostat Company in August 1948. The specific details of the breaker do not form a part of the present invention.

In operation current passes from an external source by way of electric cord 90 to contact 91 and thence thru contacts 92, 93 and 94 to the universal type motor 69 when the switch is cool and the contacts closed. As the temperature rises to a predetermined point, either thru heating by the motor or because of the heavy current, the carrier plate 95 snaps to the position shown in Figure 1 and the circuit is broken. The breaker is so adjusted that it operates when the mix has reached the proper consistency. To reset the switch, as in preparing a new batch, a push button 96 is provided within the compartment but readily accessible thru aperture 97. The operator can insert a finger thru the aperture and push the button, snapping plate 95 in the reverse direction and closing contacts 91, 92, 93, and 94.

Figure 4:
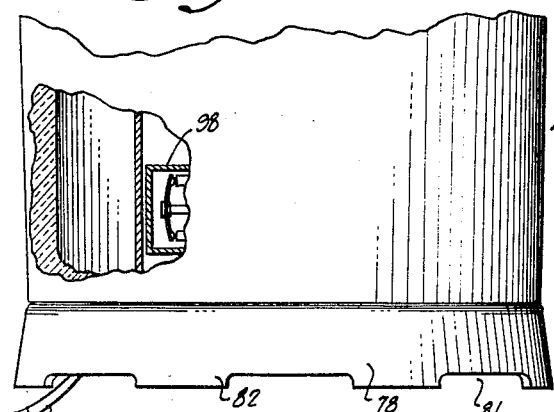
Figure 4 is an elevational view of the lower part of the container with a part of the wall broken away to show a modified type of switch means.
Figure 3:
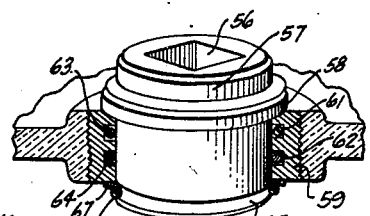
Figure 3 is a perspective view of the insulating coupling between the motor and churn, with a part of the support shown in section.

A modified form of the invention is illustrated in Figure 4 wherein the motor is of the shaded pole type having a low starting torque and stalling at loads somewhat above normal, and the casing 98 contains the automatic reset type of "Klixon" circuit breaker also illustrated in the bulletin mentioned above. In this type the contacts open upon a predetermined temperature rise as before but the carrier plate automatically snaps back as the temperature falls. With this arrangement the current will flow to the motor as soon as cord 90 is plugged into an external source. Since the mix is thin, the motor will start readily but, as the consistency increases, the motor will stall. Continued current flow will heat the switch and cause the circuit to open. The switch then cools and the current goes on from time to time as the packed ice cream stands and will operate the churn if the mix has thinned down. If not, the current will heat the stalled motor and the switch until the breaker again opens the circuit. This arrangement assures optimum condition of the ice cream or other confection over a period of many hours.

The invention also provides novel means for storing the electric cord out of the way when the device is not in use. A plurality of stiffening ribs 101 are provided on the underside of the dished wall 86 and a portion of each rib is cut away, as at 102, to form a hook so that the entire cord can be wound on the series of hooks and be retained within the storage space beneath wall 86.

A further modified form of the invention is shown in Figures 7 and 8 in which the upper refrigerant compartment 110 is formed of heat insulating material and all of the elements carried thereby are the same as in Figure 1 including the heat insulating coupling 57. However, the lower motor compartment 112 is made separately and may be plastic, metal, or other material. An inwardly extending flange 114 at its upper edge is provided with a plurality of openings to receive screws 116 for securing it to compartment 110. A dished, perforated, base member 118 is secured to member 112 by screws 120. The central horizontal portion 122 has a flanged opening 124.

Motor 126, of the universal type, is carried on a mounting plate 128 having a depending cylindrical bearing 130 seated for rotation in the flanged opening and held against axial displacement by snap ring 132. Squared shaft 134 engages plug 57 in the same manner as in the previous modifications.

A snap switch 136 is carried by the base adjacent to the motor and is provided with leads 138 from an external source and leads 140 to the motor, as well as a switch arm 142 extending toward the motor. An actuator arm 144 extends radially out from the mounting plate 126 and has two spaced upstanding lugs 146 and 148 located on opposite sides of switch arms 142. To control the operation of these parts a rod 150, having a knob 152, passes thru an aperture in lug 148 and is headed over at 154, the intermediate portion of the rod passing thru an apertured anchorage 156 secured to plate 122.

A compression spring 158 surrounds the rod between the anchorage and lug 148 and a second compression spring 160 surrounds the rod between the anchorage and a collar 162 fixed to the rod. This collar, if desired, may be adjusted longitudinally to vary the compression of the spring.

In operation the torque reaction on the motor tends to rotate it, in its bearing 124, in the direction of arrow A. This produces a tension in the rod and compression in spring 160. As the consistency of the mix increases, spring 160 becomes more compressed and the lug 148 contacts switch arm 142. The spring is so chosen or adjusted that the desired consistency is attained just as lug 148 pushes arm 142 past the center of its travel. The arm then snaps the rest of the way and the motor is turned off. To restart the motor at any time it is only necessary to pull on knob 152 until lug 146 contacts the arm 142 and pushes it past center into the "on" position.

It will thus be seen that the invention described in detail above provides a fully automatic method for preparing frozen confections and an apparatus for preparing them with a minimum expenditure of ice and power and retaining them in optimum condition for long periods of time.

It will be apparent to those skilled in the art that various changes and modifications may be made in the construction and arrangement of parts without departing from the invention and it is intended that all such changes and modifications shall be embraced within the scope of the following claims.

I claim:

1. A freezer for preparing frozen confections comprising: a vertically extending container; a horizontally extending wall within said container dividing it into upper and lower compartments; said container and wall being formed of heat insulating material; bearing means centrally located in said wall and having a vertically extending axis; a stub shaft of heat insulating material rotatably mounted in said bearing; motor means mounted in said lower compartment and having a shaft in driving engagement with said stub shaft; a confection container in said upper compartment of substantially less lateral extent than the lateral dimension of said upper compartment; the lower end of said second container being drivably supported by said stub shaft; a lid having a releasable, substantially air tight connection with the upper end of said upper compartment; a non-circular socket in the underside of said lid; a mixer having a vertical shaft, the upper end of which is non-rotatably engaged in said socket and the lower end of which is rotatably engaged in the base of said second container; and a cover for said second container rotatably journaled on said mixer shaft; the inner surface of said upper compartment being so formed as to resist movement of ice when said second container is rotated by said motor means.

2. A freezer as claimed in claim 1 and, in addition thereto; means actuated by increased torque requirements of said second container to deactivate said motor means.

3. A freezer for preparing frozen confections comprising: a container having a vertically extending axis; a horizontally extending wall of heat insulating material within said container dividing it into upper and lower compartments; a confection mixer and freezer mounted within said upper compartment for rotation about a vertical axis; a driving motor mounted in said lower compartment and producing relatively high temperatures during operation; and a coupling of heat insulating material passing thru and journalled in said dividing wall, one end of said coupling having driving engagement with said mixer and freezer and the other end of said coupling having driving engagement with said motor; whereby said motor is enabled to drive said mixer and freezer with a minimum transfer of heat from the lower compartment to the upper compartment.

4. A freezer for preparing frozen confections comprising: a vertically extending refrigerant compartment of heat insulating material; a motor compartment arranged substantially coaxially with said refrigerant compartment; means providing an insulating wall between said compartments; a confection mixer and freezer mounted in said refrigerant compartment and having a rotatable member; motor means mounted in said motor compartment; and drive means formed of heat insulating material passing thru said wall and transmitting driving force from said motor means to said rotatable member.

5. A freezer for preparing frozen confections comprising: a refrigerant compartment; movable means within said compartment to churn said confection; driving means mounted exteriorly of said compartment; and a drive coupling of heat insulating material passing thru and journaled in a wall of said compartment to transmit driving forces from said driving means to said movable means.

6. A freezer for preparing frozen confections comprising: a container formed of heat insulating material and having a vertically extending axis; a horizontal dividing wall integral therewith and dividing said container into upper and lower compartments; a confection mixer and freezer rotatably mounted in said upper compartment; a driving motor mounted in said lower compartment; a heat insulating coupling passing thru and journaled in said dividing wall to transmit driving force from said motor to said freezer; and vertically elongated ribs extending inwardly from the inner wall of said upper compartment; the free space between said mixer and freezer and the inner edges of said ribs being less than the minimum dimension of a conventional ice cube produced in a domestic refrigerator.

7. A freezer for preparing frozen confections comprising: a container having a vertically extending axis; a confection mixer and freezer mounted within said container for rotation about a vertical axis; and at least one vertically elongated rib directly connected to and extending radially inwardly from the inner wall of said container; the free space between said mixer and freezer and the inner edge of said rib being of the order of one inch; said construction providing a clear path for direct contact of ice with said mixer and freezer.

8. A freezer for preparing frozen confections comprising: a container having a vertical axis; a horizontally extending wall within said container dividing it into upper and lower compartments; a mixer and freezer mounted within the upper compartment for rotation about a vertical axis; an electrical driving motor, having a circuit adapted for connection to an external power source, mounted within the lower compartment; a drive coupling from the motor to the mixer and freezer passing thru said dividing wall; an automatic switch mounted on said motor and operated by a predetermined temperature rise in said motor to open said circuit; and manual means on said switch within said lower compartment but accessible from the exterior thereof for closing said circuit.

9. A freezer for preparing frozen confections comprising: a container divided into upper and lower compartments; a mixer and freezer mounted for rotation in the upper compartment; an electrical driving motor, having a circuit adapted for connection to an external power source, mounted within the lower compartment; a drive coupling from the motor to the mixer and freezer; a resettable automatic switch mounted on said motor and operated by a predetermined temperature rise in said motor to open said circuit; and openings of predetermined size formed in said lower compartment to furnish limited ventilation in order to produce said temperature rise and to permit cooling of said motor after said circuit has been opened.

10. A freezer for preparing frozen confections comprising: a unitary container having a substantially cylindrical wall about a vertical axis and an integral horizontal wall extending across the interior and dividing it into upper and lower compartments; a mixer and freezer rotatably mounted in the upper compartment; an electrical driving motor mounted in the lower compartment; a heat insulating coupling passing thru said dividing wall to connect the motor to the mixer and freezer; a base member closing the open lower end of said lower compartment; and openings of predetermined size formed in said base member to provide controlled ventilation and produce a predetermined temperature rise in said motor.

11. In a freezer for preparing frozen confections including an open ended container having a vertical axis and provided with a horizontal partition wall dividing it into upper and lower compartments; an electric motor in said lower compartment suspended from said partition wall; a cowling spacedly surrounding said motor and providing a path for air flow; a fan mounted below and driven by said motor; a base member closing the open end of said lower compartment; openings formed in said base member to provide entrance and exit ports for air flow produced by said fan; a thermally actuated cut out switch mounted on said motor; and a re-set button on said switch arranged for actuation from the exterior of said container.

12. In a freezer for preparing frozen confections including an open ended container having a vertical axis and provided with a horizontal partition wall dividing it into upper and lower compartments; a rotatably mounted freezer in said upper compartment; an electric motor mounted in said lower compartment; drive means extending through said partition wall from said motor to said freezer; cooling means for said motor adequate to cool said motor under light and medium load conditions but inadequate to prevent a substantial increase of temperature under high load conditions; and a thermally actuated cutout switch in said lower compartment which is inactive at normal running temperatures of said motor but which is set to act upon a predetermined temperature rise to turn off said motor.

13. A freezer for preparing frozen confections comprising: a refrigerant compartment having walls adapted to reduce heat transmission therethru; a confection container rotatably mounted in said compartment in spaced relation to the walls thereof to provide for storage of refrigerant material; means on said container for cooperative engagement with a drive coupling; apertured bearing means in a wall of said compartment; driving means mounted exteriorly of said compartment; and a drive coupling rotatably mounted in said bearing means and extending outwardly into engagement with said driving means to be driven thereby and extending inwardly into driving engagement with said container; at least a portion of the drive coupling being formed of heat insulating material to interrupt the heat transmission path from the exterior to said container.

14. Means for preparing frozen confections comprising: a refrigerant compartment; a confection container rotatably mounted in said compartment to be cooled by a refrigerant contained in said compartment; a mixer located within said container and non-rotatably connected to said compartment to oppose resistance to rotation of said container upon congealment of a confection in said container; an electrical driving motor, having a circuit adapted for connection to an external power source, carried by said compartment; a switch for opening and closing said circuit also carried by said compartment; drive means connecting said motor to said container; and mechanical actuating means extending from said motor to said switch and adapted to throw said switch to circuit opening position in response to a predetermined torque developed by said motor in overcoming the resistance of said mixer as the confection congeals to a desired consistency.

15. Means for preparing frozen confections comprising: a refrigerant compartment; a confection container rotatably mounted in said compartment to be cooled by a refrigerant contained in said compartment; a mixer located within said container and non-rotatably connected to said compartment to oppose resistance to rotation of said container upon congealment of a confection in said container; an electrical driving motor, having a circuit adapted for connection to an external power source, rotatably mounted on a portion of said compartment; a switch for opening and closing said circuit also mounted on a portion of said compartment; drive means connecting said motor to said container; resilient restraining means anchored to said compartment and resisting rotational movement of said motor in response to torque developed thereby in overcoming the resistance of said mixer as the confection becomes more congealed; and mechanical actuating means extending from said motor to said switch and adapted to throw said switch to circuit opening position in response to a predetermined torque developed by said motor sufficient to overcome the resistance of said resilient restraining means.

EDWARD F. BURTON.

REFERENCES CITED

The following references are of record in the file of this patent:

UNITED STATES PATENTS

| Number | Name | Date |
|---|---|---|
| 637,078 | Burr | Nov. 14, 1899 |
| 1,609,915 | Parker | Dec. 7, 1926 |
| 1,940,473 | Vogt | Dec. 19, 1933 |
| 1,953,766 | McMath | Apr. 3, 1934 |
| 2,034,213 | Smith | Mar. 17, 1936 |
| 2,200,477 | Newton | May 14, 1940 |
| 2,358,756 | Zoller | Sept. 19, 1944 |